United States Patent
Niino et al.

(10) Patent No.: US 7,212,903 B2
(45) Date of Patent: May 1, 2007

(54) VEHICLE MOTION CONTROL APPARATUS

(75) Inventors: Hiroaki Niino, Toyota (JP); Hiroaki Aizawa, Anjo (JP); Minekazu Momiyama, Chiryu (JP); Hiroaki Kato, Hekinan (JP)

(73) Assignees: Advics Co., Ltd., Kariya, Aichi-Ken (JP); Toyoda Koki Kabushiki Kaisha, Kariya, Aichi-Ken (JP)

( * ) Notice: Subject to any disclaimer, the term of this patent is extended or adjusted under 35 U.S.C. 154(b) by 409 days.

(21) Appl. No.: 10/938,552

(22) Filed: Sep. 13, 2004

(65) Prior Publication Data

US 2005/0065697 A1    Mar. 24, 2005

(30) Foreign Application Priority Data

Sep. 16, 2003  (JP)  ............... 2003-322506

(51) Int. Cl.
  *G06G 7/76*  (2006.01)
(52) U.S. Cl. ...................................... 701/71
(58) Field of Classification Search ............ 701/71
  See application file for complete search history.

(56) References Cited

U.S. PATENT DOCUMENTS 5,915,800 A * 6/1999 Hiwatashi et al. .......... 303/146

2006/0100766 A1 * 5/2006 Schwarz et al. ............ 701/71

FOREIGN PATENT DOCUMENTS

JP    5-105055    4/1993

* cited by examiner

*Primary Examiner*—Thu V. Nguyen
(74) *Attorney, Agent, or Firm*—Buchanan Ingersoll & Rooney PC

(57) ABSTRACT

A vehicle motion control apparatus is provided with an anti-skid control device and a steering angle adjusting device, which adjusts the steering angle of at least one of the front and rear wheels to cancel a yaw deviation between a desired yaw factor and an actual yaw factor, to be substantially zero. An incompatibility between the devices is determined on the basis of a state of the wheel adjusted by the steering angle adjusting device to cancel the yaw deviation. And, a predetermined parameter provided between a vehicle stability directive parameter and a brake directive parameter is set on the basis of the incompatibility. Then, the anti-skid control device controls the braking force applied to each wheel of the vehicle on the basis of the predetermined parameter. Consequently, the anti-skid control giving importance to the braking force can be performed, as long as the steering angle adjusting device is operative.

8 Claims, 10 Drawing Sheets

VEHICLE MOTION CONTROL APPARATUS

This application claims priority under 35 U.S.C. Sec. 119 to No. 2003-322506 filed in Japan on Sep. 16, 2003, the entire content of which is herein incorporated by reference.

BACKGROUND OF THE INVENTION

1. Field of the Invention

The present invention relates to a vehicle motion control apparatus, and particularly relates to a vehicle motion control apparatus provided with a steering angle adjusting device for adjusting a steering angle of a front or rear wheel of a vehicle, and an anti-skid control device for controlling braking force applied to each wheel.

2. Description of the Related Arts

With respect to a vehicle provided with the steering angle adjusting device and anti-skid control device, it has been proposed to provide an apparatus for controlling them appropriately. In Japanese Patent Laid-pen Publication No. 5-105055, for example, in order to control both of right and left wheels individually to be braked with a minimal stopping distance even if the vehicle was running on a split road surface, and to prevent unintentional yaw moment form being produced on the vehicle, there is proposed such an apparatus for controlling a running condition during braking operation as the one provided with a wheel steering device for adjusting a steered angle of a wheel so as to cancel a yaw rate deviation, and an anti-skid control device for controlling the braking force applied to right and left wheels individually.

Although it has been proposed to ensure both of a minimal braking distance and a stability in the Japanese Publication No. 5-105055 as described above, the wheel steering apparatus is designed to be controlled on the basis of the yaw rate deviation, so that it is actually actuated after an unexpected vehicle behavior was occurred. Therefore, it is difficult to actuate the apparatus in response to a rapid change of the vehicle behavior. On the contrary, although the anti-skid control device has been constituted basically to control the individual braking force for each wheel of right and left wheels, it is not easy to obtain the minimal braking distance, with the vehicle stability being ensured, depending upon conditions of the wheel steering device, including a case where the steering angle adjustment was inoperative, for example, so that other countermeasures might be required, separately.

SUMMARY OF THE INVENTION

Accordingly, in a vehicle provided with a steering angle adjusting device and an anti-skid control device, it is an object of the present invention to provide a vehicle motion control apparatus capable of obtaining a minimal braking distance, with a vehicle stability being ensured, by controlling the anti-skid control device appropriately in response to a condition of the steering angle adjusting device.

In accomplishing the above object, the vehicle motion control apparatus is provided with an anti-skid control device for controlling a braking force applied to each wheel of a vehicle, and a steering angle adjusting device for adjusting a steering angle of at least one of front and rear wheels of the vehicle. And, the vehicle motion control apparatus includes a vehicle state monitor for monitoring at least the steering angle and a vehicle speed, a desired yaw factor setting unit for setting a desired yaw factor indicative of a desired value for performing an optimal behavior control of the vehicle, on the basis of the steering angle and vehicle speed monitored by the vehicle state monitor, a yaw factor detection unit for detecting an actual yaw factor of the vehicle, and a yaw deviation calculation unit for calculating a yaw deviation between the desired yaw factor set by the desired yaw factor setting unit and the actual yaw factor detected by the yaw factor detection unit. The steering angle adjusting device is adapted to adjust the steering angle of at least one of the front and rear wheels to cancel the yaw deviation calculated by the yaw deviation calculation unit to be substantially zero. The vehicle motion control apparatus further includes an incompatibility determination unit for determining incompatibility between the steering angle adjusting device and the anti-skid control device, on the basis of a state of the wheel adjusted by the steering angle adjusting device to cancel the yaw deviation calculated by the yaw deviation calculation unit, and a parameter setting unit for setting a predetermined parameter provided between a vehicle stability directive parameter and a brake directive parameter, on the basis of the incompatibility determined by the incompatibility determination unit. Then, the anti-skid control device is adapted to control the braking force applied to each wheel of the vehicle on the basis of the predetermined parameter set by the parameter setting unit.

According to the incompatibility determination unit, therefore, the anti-skid control device may be controlled, on the basis of the result determined whether it is possible to cancel the yaw rate deviation provided for the steering angle adjusting device as a desired value thereof in response to the state of the steering angle adjusting device or the vehicle state, for example, so that the control giving importance to the braking force can be performed, as long as the steering angle adjusting device is operative. For instance, as the braking force can be controlled to produce a maximal braking force, with the side force being produced by the steering angle adjusting device to cancel the yaw rate deviation, the vehicle stability can be ensured, and the minimal braking distance can be obtained.

In the vehicle motion control apparatus as described above, it may be so constituted that the parameter setting unit sets the predetermined parameter to be close to the vehicle stability directive parameter when the incompatibility determination unit determined that the adjustment of the wheel by the steering angle adjusting device is inoperative, and that the parameter setting unit sets the predetermined parameter to be close to the brake directive parameter when the incompatibility determination unit determined that the adjustment of the wheel by the steering angle adjusting device is operative. Consequently, even if the incompatibility was changed during a braking operation, the braking force and the stability could be balanced at a high level, according to the anti-skid control provided for each occasional state.

The yaw deviation calculation unit may be adapted to calculate at least one of a yaw rate deviation, a yaw angle deviation and a variation of yaw rate deviation to provide the yaw deviation, and the incompatibility determination unit may be adapted to compare the yaw deviation with a predetermined threshold value, to determine the incompatibility on the basis of the result of comparison. Consequently, it can be so constituted that the anti-skid control is changed to the control giving importance to the stability, in the case where the stability can not be effected or can not be expected, while the steering angle adjusting device is operative.

The incompatibility determination unit may be adapted to compare the steering angle adjusted by the steering angle adjusting device with a predetermined threshold value, to determine the incompatibility on the basis of the result of comparison. Therefore, it can be estimated that the stability control will not be ensured, when it is determined on the basis of the result of comparison that a margin for adjusting the steering angle has been decreased or lost, whereby the anti-skid control can be changed to the control giving importance to the stability.

Or, the incompatibility determination unit may be adapted to set the predetermined threshold value on the basis of at least one of the vehicle speed and a vehicle deceleration calculated on the basis thereof. Therefore, the anti-skid control can be changed to the control giving importance to the stability, in response to the vehicle speed.

BRIEF DESCRIPTION OF THE DRAWINGS

The above stated object and following description will become readily apparent with reference to the accompanying drawings, wherein like referenced numerals denote like elements, and in which.

DESCRIPTION OF THE PREFERRED EMBODIMENTS

Figure 1:
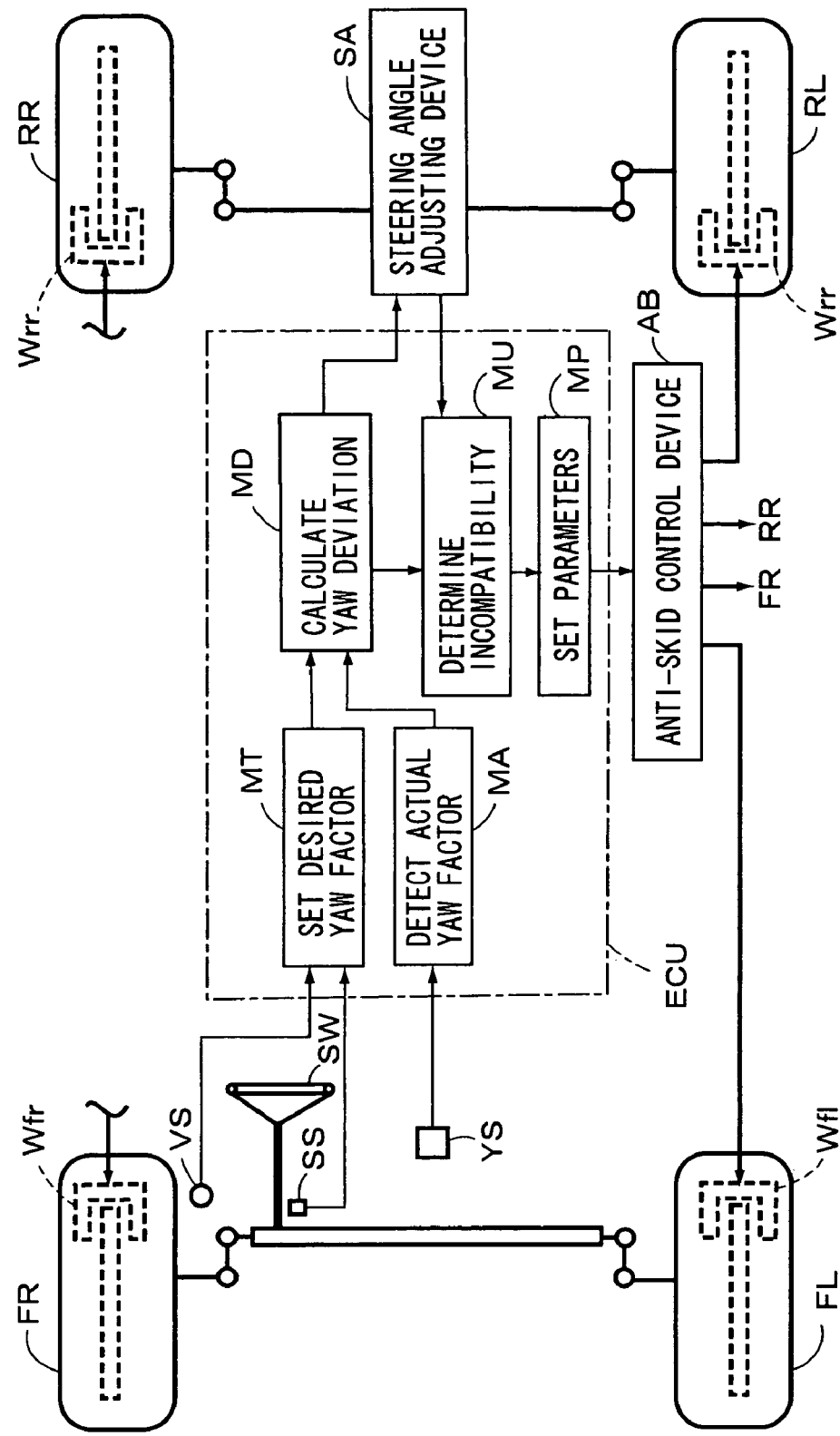
FIG. 1 is a schematic block diagram showing a vehicle motion control apparatus according to an embodiment of the present invention.

Referring to FIG. 1, there is schematically illustrated a block diagram of a vehicle motion control apparatus according to an embodiment of the present invention. The apparatus includes a steering angle adjusting device SA for adjusting a steering angle with respect to rear wheels RL and RR of a vehicle, and an anti-skid control device AB for controlling a braking force applied to each wheel. As shown in FIG. 1, wheel brake cylinders Wfl, Wfr, Wrl, Wrr are operatively associated with the wheels FL, FR, RL, RR, respectively, and connected to the anti-skid control device AB. As the anti-skid control device AB is the same as an ordinary device provided with a plurality of solenoid valves, and the present embodiment is not characterized in a specific hydraulic braking pressure control, a drawing and explanation thereof are omitted herein. In FIG. 1, the wheel FL designates the wheel at the front left side as viewed from the position of a driver's seat, the wheel FR designates the wheel at the front right side, the wheel RL designates the wheel at the rear left side, and the wheel RR designates the wheel at the rear right side.

The front wheels FL and FR are steered in response to operation of a steering wheel SW operated by a vehicle driver, and a steering angle is detected by a steering angle sensor SS. A vehicle speed sensor VS is provided for detecting the vehicle speed, which may be differentiated to provide a vehicle deceleration. Alternatively, wheel speeds may be detected by wheel speed sensors (not shown) operatively mounted on the wheels, to estimate the vehicle speed on the basis of the detected wheel speeds. Furthermore, a yaw rate sensor YS is provided for detecting a yaw rate of the vehicle, thereby to detect directly the yaw rate served as the yaw factor. That is, the yaw factor includes a rotational angle of the vehicle about a normal on the center of gravity of the vehicle, i.e., a yaw angle, and a yaw rate which is an angular velocity of the yaw angle, and which is used as the yaw factor according to the present embodiment. Furthermore, there may be disposed a longitudinal acceleration sensor (not shown) for detecting a vehicle longitudinal acceleration, a lateral acceleration sensor (not shown) for detecting a vehicle lateral acceleration, or the like. The detected signals are fed to an electronic control unit ECU which is provided for performing a traction control, vehicle stability maintaining control, or the like, in addition to the steering angle adjustment and anti-skid control as described above, and which is provided with CPU, ROM and RAM (not shown) for those controls.

In the electronic control unit ECU, there are constituted a desired yaw factor setting unit MT for setting a desired yaw factor (desired yaw rate) indicative of a desired value for performing an optimal behavior control of the vehicle, on the basis of the steering angle and vehicle speed monitored by the sensors SS and VS which are served as the vehicle state monitor, a yaw factor detection unit MA for detecting an actual yaw factor of the vehicle, and a yaw deviation calculation unit MD for calculating a yaw deviation between the desired yaw factor set by the desired yaw factor setting unit MT and the actual yaw factor detected by the yaw factor detection unit MA. The steering angle adjusting device SA is adapted to adjust the steering angle of at least one of the front and rear wheels to cancel the yaw deviation (yaw rate deviation) calculated by the yaw deviation calculation unit MD to be substantially zero. Furthermore, an incompatibility determination unit MU is provided for determining incompatibility between the steering angle adjusting device SA and the anti-skid control device AB, on the basis of a state of the wheel adjusted by the steering angle adjusting device SA to cancel the yaw deviation calculated by the yaw deviation calculation unit MD, and a parameter setting unit MP is provided for setting a predetermined parameter provided between a vehicle stability directive parameter and a brake directive parameter, on the basis of the incompatibility determined by the incompatibility determination unit MU. The anti-skid control device AB is adapted to control the braking force applied to each wheel of the vehicle on the basis of the predetermined parameter set by the parameter setting unit MP. The electronic control unit ECU is not necessarily a single unit, but the aforementioned units may be constituted in an electronic control unit for steering control (not shown) and an electronic control unit for braking control (not shown), or may be constituted in a different unit from those units, and these may be connected with each other through a communication unit (not shown).

In the parameter setting unit MP, the predetermined parameter is set to be close to the vehicle stability directive parameter when the incompatibility determination unit MU determines that the adjustment of the wheel by the steering angle adjusting device SA is inoperative, whereas the predetermined parameter is set to be close to the brake directive parameter when the incompatibility determination unit MU determines that the adjustment of the wheel by the steering angle adjusting device SA is operative. Those predetermined parameters are set to be of various values in response to various conditions, as explained with reference to the following flowcharts.

According to the vehicle motion control apparatus of the present embodiment, therefore, when the steering angle adjusting device SA is inoperative, for example, substantially the same control as the conventional anti-skid control device is performed, because the steering angle control can not be used to ensure the stability. When the steering angle adjusting device SA is operative, the anti-skid control giving importance to the braking force can be performed, with the stability being ensured through the steering control. Furthermore, when the vehicle is running at high speed or at low deceleration, such a situation that a vehicle driver may feel uneasy due to a small change in vehicle behavior can be avoided by decreasing the threshold value, for example, and the vehicle stability can be ensured on a road of low coefficient of friction.

Incidentally, the anti-skid control giving importance to the braking force means a control for decreasing the vehicle speed more effectively, comparing with the anti-skid control giving importance to the stability. With respect to a certain wheel, for example, the control parameter for the anti-skid control giving importance to the braking force is adjusted to increase the longitudinal force to the vehicle, comparing with the anti-skid control giving importance to the stability. On the contrary, the anti-skid control giving importance to the stability means a control for increasing the side force to the vehicle, comparing with the anti-skid control giving importance to the braking force. With respect to a certain wheel, for example, the control parameter is adjusted to increase the side force, comparing with the anti-skid control giving importance to the braking force. In addition, such a control for positively adjusting the difference in braking force between the right and left wheels applied thereto, so as to cancel an unstable moment, may be included in the anti-skid control giving importance to the stability.

Figure 2:
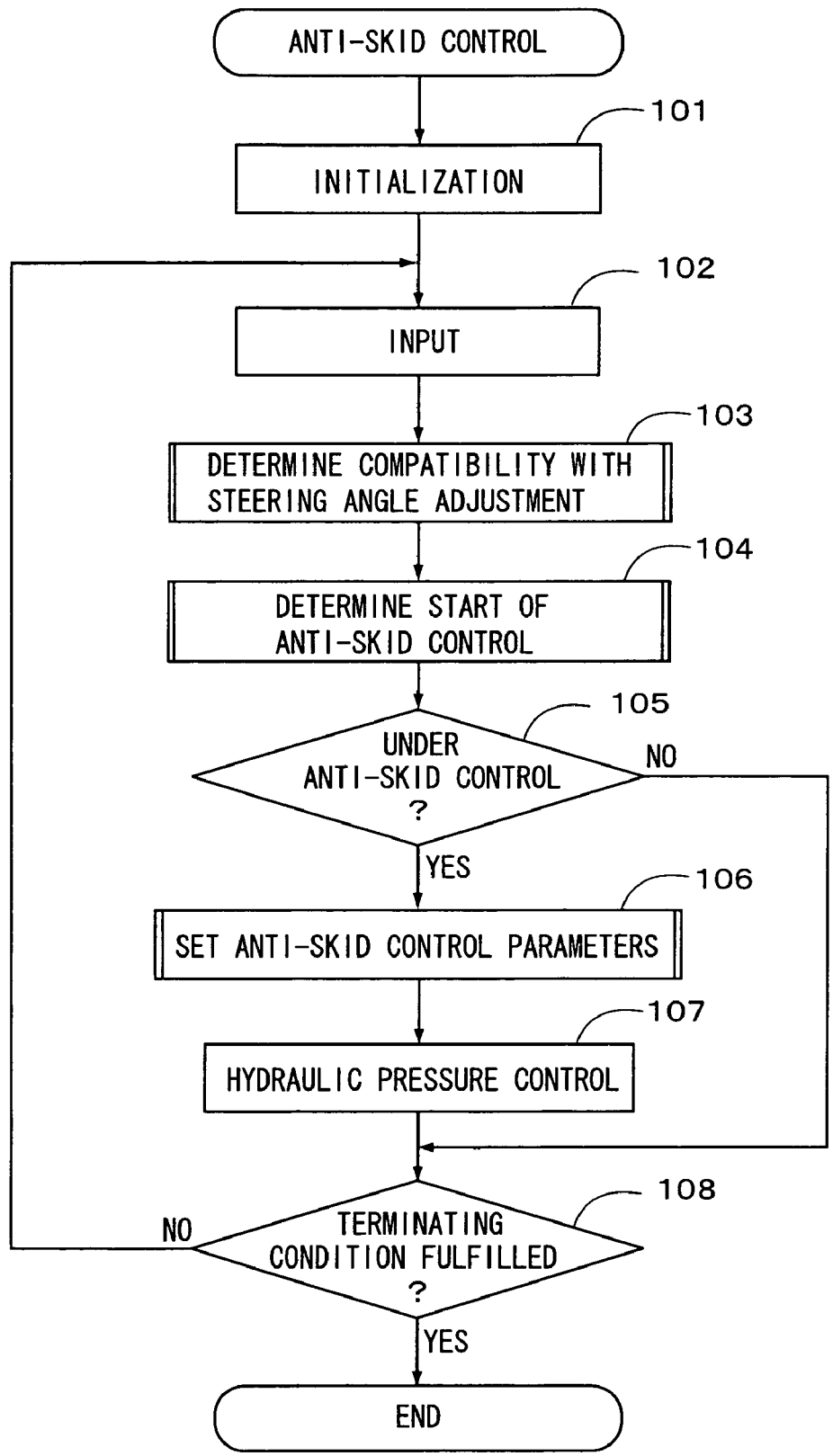
FIG. 2 is a flowchart showing operation of an anti-skid control according to an embodiment of the present invention.
Figure 4:
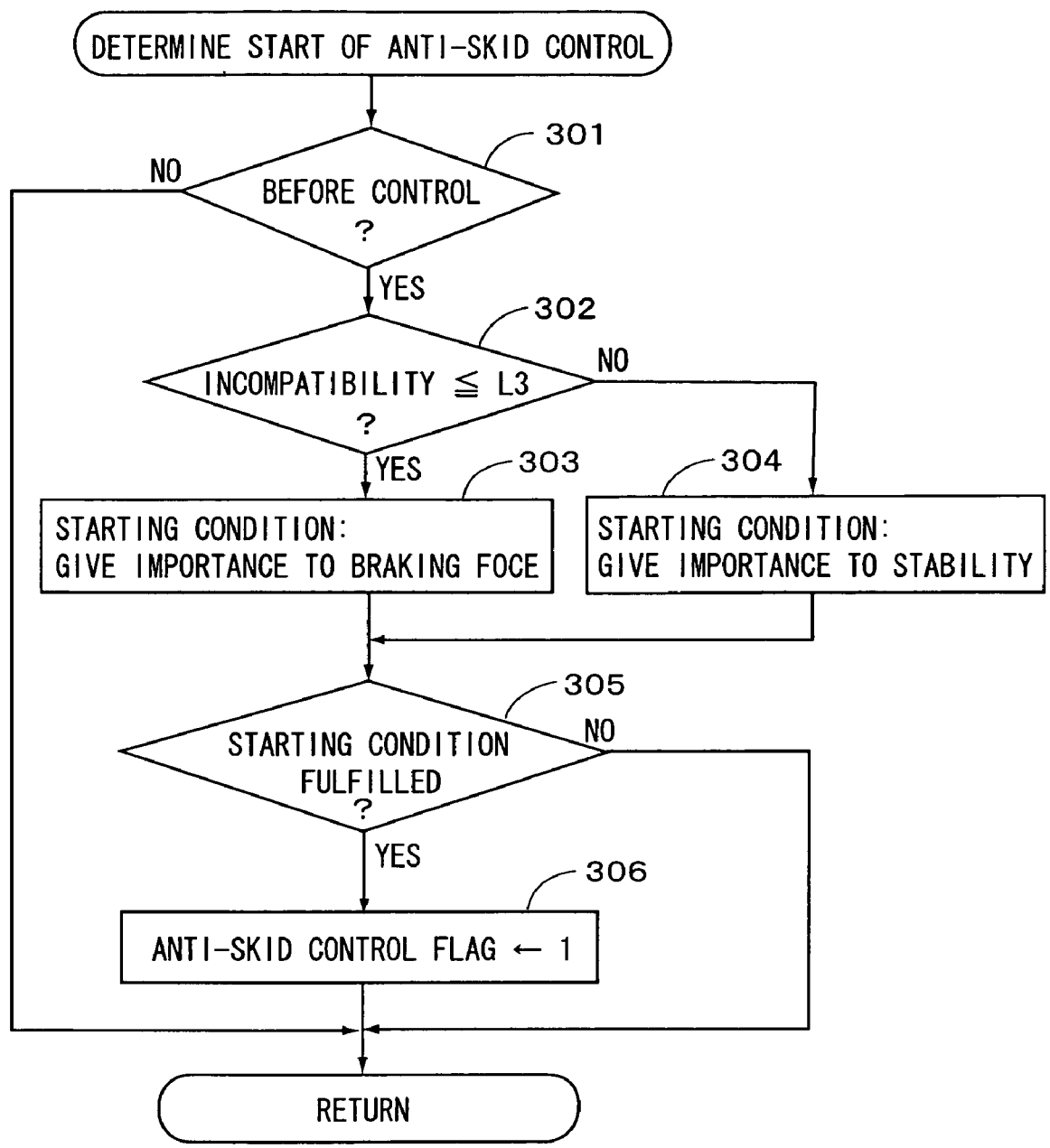
FIG. 4 is a flowchart showing operation of determining a start of anti-skid control according to an embodiment of the present invention.
Figure 5:
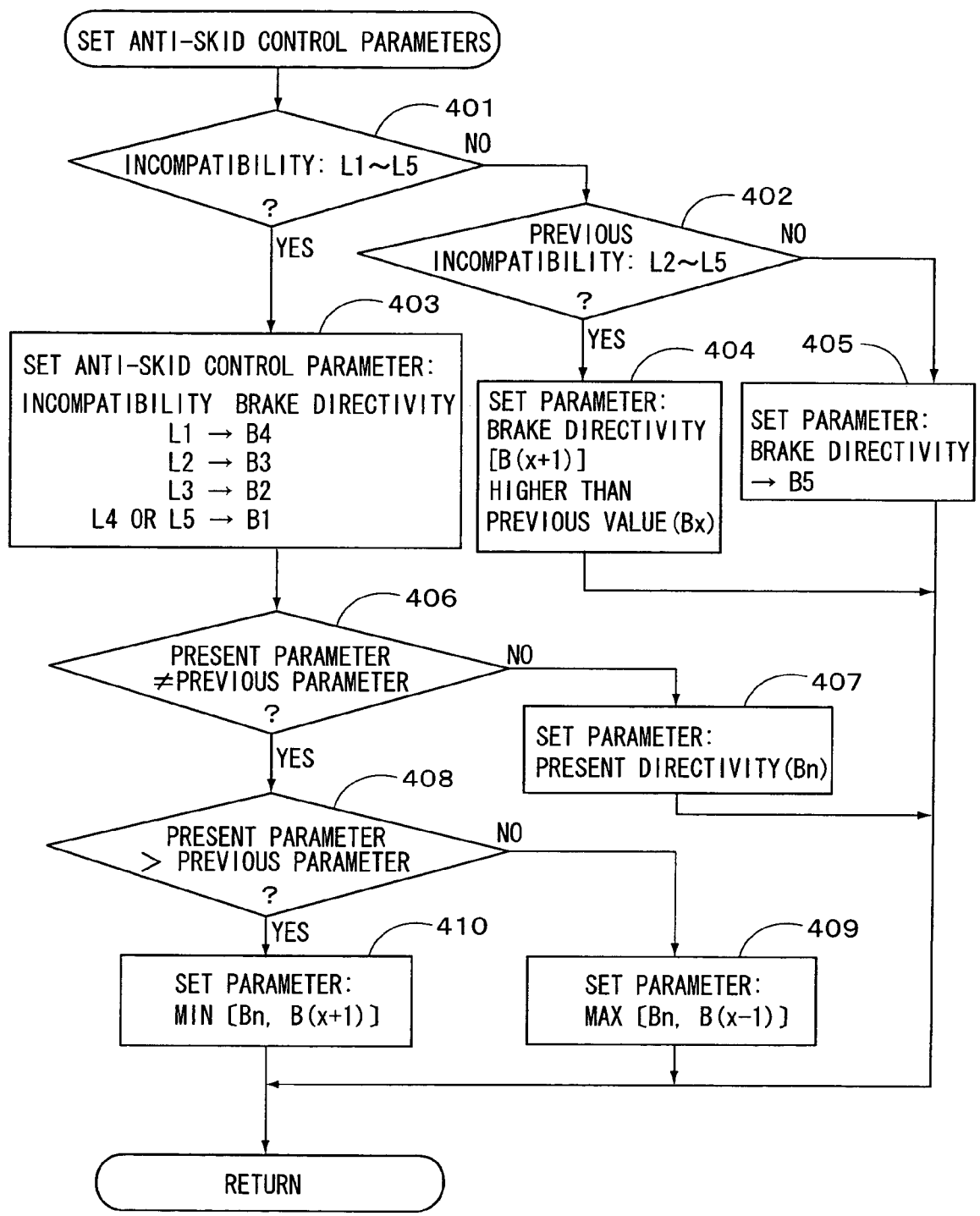
FIG. 5 is a flowchart showing operation of setting parameters for starting an anti-skid control according to an embodiment of the present invention.

According to the embodiment as constituted above, the anti-skid control is achieved by the electronic control unit ECU, as shown in FIG. 2. At the outset, the program provides for initialization of the system at Step 101, and the sensor signals are input so that the steering angle, vehicle speed, yaw rate or the like are read at Step 102, and filtered to be stored in the memories in sequence. Then, the program proceeds to Step 103 where the incompatibility with the steering angle adjustment is determined, and proceeds to Step 104 where the start of anti-skid control is determined. Next, at Step 105, it is determined whether the anti-skid control is being performed or not, i.e., whether an anti-skid control flag as described later has been set or not. If it is determined that the anti-skid control is being performed, the program proceeds to Step 106 where parameters for the anti-skid control are set, and then to Step 107 where the hydraulic pressure in each wheel brake cylinder is controlled on the basis of the parameters. Finally, a termination of the control is determined at Step 108, and if the termination condition has not been fulfilled, the program returns to Step 102. Accordingly, the Steps 102–107 are repeated at a predetermined period of cycle, with Steps 103, 104 and 106 performed as shown in FIGS. 3–5 respectively, as will be described later in detail.

Figure 3:
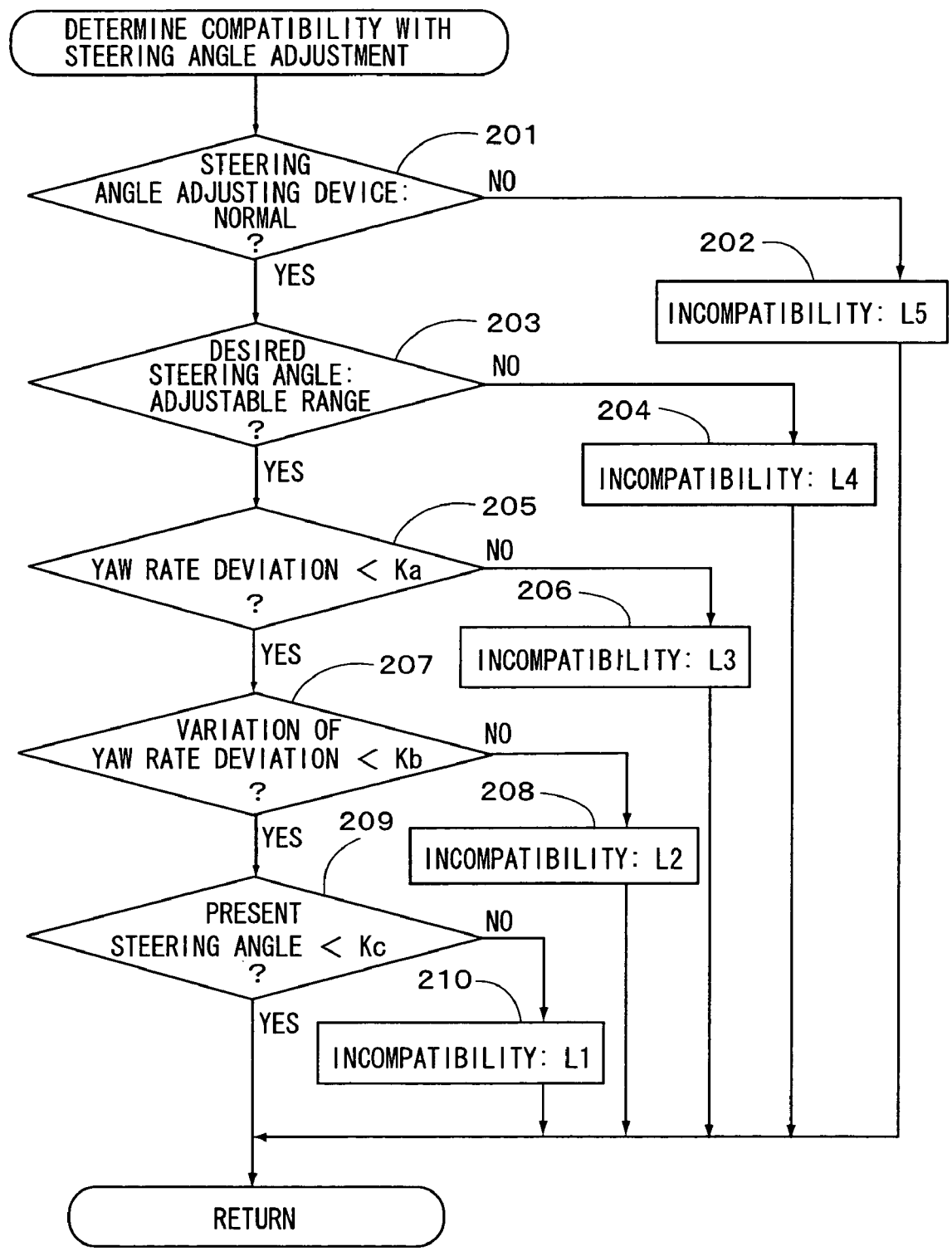
FIG. 3 is a flowchart showing operation of determining compatibility with steering angle adjustment according to an embodiment of the present invention.

FIG. 3 shows an example of operation of determining the compatibility with steering angle adjustment performed at Step 103 as described above, whereby the incompatibility between the anti-skid control and the steering angle adjustment is determined in response to the steering angle adjusting condition provided by the steering angle adjusting device SA. That is, according to the present embodiment, it is so constituted that the incompatibility of the steering angle adjusting device SA with the anti-skid control is determined by the incompatibility determination unit MU as shown in FIG. 1, and the determination of the incompatibility is achieved at the Steps for determining the compatibility as shown in FIG. 3.

At the outset, in FIG. 3, it is determined at Step 201 whether the steering angle adjustment can be made by the steering angle adjusting device SA or not. That is, it is determined whether the steering angle adjusting device SA is normal (operative) or not, based upon determination of mechanical failure, or abnormalities of electric system, electronic control units and various sensors. If the result is negative (i.e., abnormal), it is determined to be in such a situation that the desired steering angle adjustment can not be made, whereby the program proceeds to Step 202 where the incompatibility is set to be a maximal value of L5 (level of incompatibility). For example, if the incompatibility of L5 was given during the anti-skid control operation, the control would be immediately changed into a control with a relatively low threshold level of slip rate, or a so-called low select control for making the vehicle stability control by canceling the difference in braking force between the right and left wheels. As for the anti-skid control performed in this case, is performed the same control as the anti-skid control for a vehicle without the steering angle adjusting device SA being equipped. If the incompatibility of L5 was given before the anti-skid control operation begins, the control may be set to ensure the vehicle stability immediately after the anti-skid control operation begins, for instance, by setting the starting condition of the anti-skid control for each wheel to be added by such a requirement that other wheels are to be under the anti-skid control, in addition to the starting condition for the wheel to be controlled.

If it is determined at Step 201 that the steering angle adjusting device SA is normal (operative), the program proceeds to Step 203, where it is determined whether the desired steering angle is within an adjustable range. In other words, it is determined whether it is physically possible to provide a steering angle adjusted for canceling the yaw rate deviation. In this case, the present steering angle is the actual steering angle adjusted by the steering angle adjusting device SA, and the desired steering angle to be adjusted corresponds to a steering amount to be steered from the present steering angle, for canceling the yaw rate deviation. Then, the sum of the present steering angle and the desired steering angle to be adjusted is set to be the desired steering angle, which will be compared with the adjustable range, i.e., the maximal steering angle that is defined by an mechanical and electrical constraint. If it is determined at Step 203 that the yaw rate deviation could not be cancelled in calculation, even if the adjustment of the steering angle was achieved up to the maximal steering angle, then the program proceeds to Step 204 where the incompatibility is set to be of L4. In this case, it is estimated to be in such a state that it is almost impossible to ensure the vehicle stability, so that the control is changed into the vehicle stability directive control at the same level of the incompatibility L5.

Figure 6:
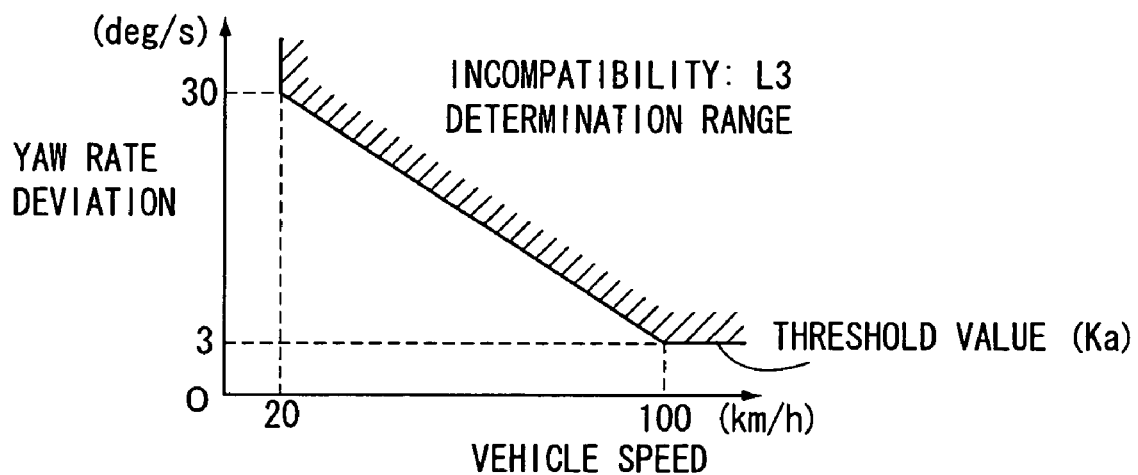
FIG. 6 is a diagram showing a map provided for determining incompatibility on the basis of a relationship between a vehicle speed and a yaw rate deviation according to an embodiment of the present invention.
Figure 7:
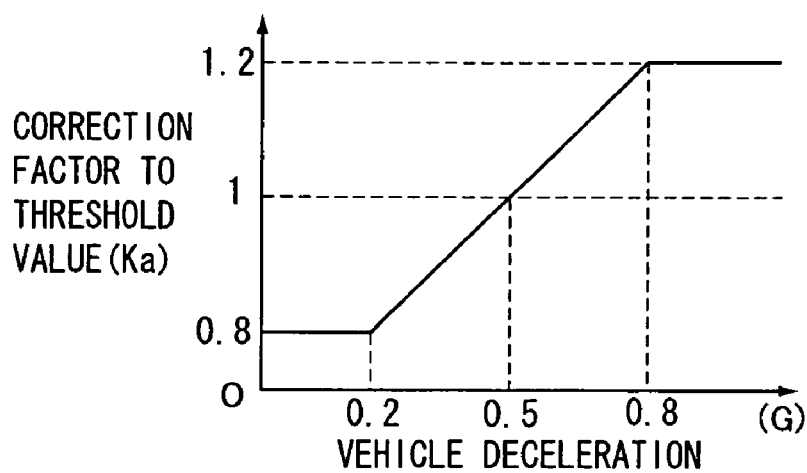
FIG. 7 is a diagram showing an example of setting a correction factor to a threshold value in response to a vehicle deceleration according to an embodiment of the present invention.

If it is determined at Step 203 that the desired steering angle is within the adjustable range, the program further proceeds to Step 205 where the yaw rate deviation is compared with a predetermined threshold value (Ka). If it is determined that the yaw rate deviation is equal to or larger than the threshold value (Ka), i.e., if it is determined that the vehicle stability is being deteriorated, the program proceeds to Step 206 where the incompatibility is set to be of L3. In this case, it is determined that there is a possibility that the vehicle stability is achieved by adjusting the steering angle, so that a rather brake directive anti-skid control parameter is set, comparing with the incompatibilities L4 and L5. As shown in FIG. 6, the threshold value (Ka) may be set as a variable varied in response to the vehicle speed, whereby in such a high speed range that a vehicle driver is likely to feel more dangerous due to an unintentional yaw variation, it is determined to be more incompatible. Furthermore, the threshold value (Ka) may be multiplied by a correction factor provided in response to the vehicle deceleration, as shown in FIG. 7. As a result, in the case where it is more likely that the vehicle stability will be deteriorated, in such a condition that the vehicle is running on a relatively low coefficient of friction, for example, it can be determined to be much more incompatible.

Figure 8:
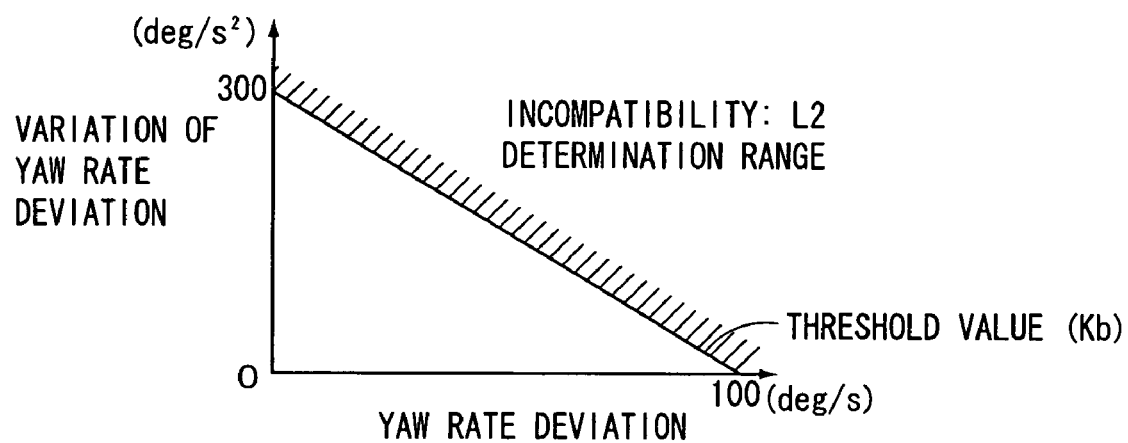
FIG. 8 is a diagram showing a map provided for determining incompatibility on the basis of a relationship between a yaw rate deviation and a variation of yaw rate deviation according to an embodiment of the present invention.
Figure 9:
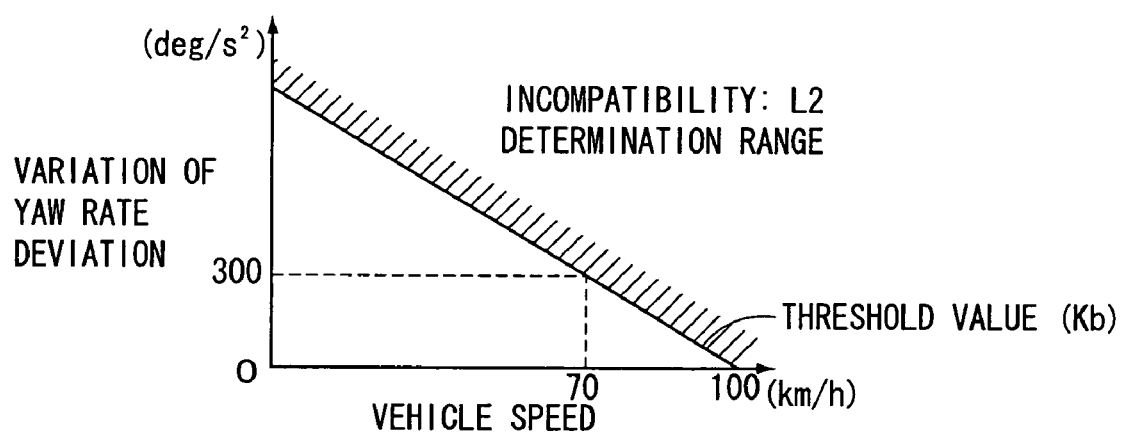
FIG. 9 is a diagram showing a map provided for determining incompatibility on the basis-of a relationship between a vehicle speed and a variation of yaw rate deviation according to an embodiment of the present invention.

If it is determined at Step 205 that the yaw rate deviation is smaller than the threshold value (Ka), the program proceeds to Step 207 where the variation of yaw rate deviation is compared with a predetermined threshold value (Kb). If it is determined that the variation of yaw rate deviation is equal to or larger than the predetermined threshold value (Kb), i.e., if it is determined that the vehicle stability is getting deteriorated, the program proceeds to Step 208 where the incompatibility is set to be of L2. In this case, it is determined that the vehicle stability has not been actually deteriorated, but there may be a possibility that the vehicle might be made unstable in the future, so that a rather brake directive anti-skid control parameter (giving more importance to the braking force) is set, comparing with the incompatibility L3. As shown in FIG. 8, the threshold value (Kb) may be set as a variable varied in response to the yaw rate deviation, whereby the threshold value (Kb) may be set, taking into consideration that the future incompatibility will be increased depending upon the present incompatibility. Alternatively, as shown in FIG. 9, the threshold value (Kb) may be set as a variable varied in response to the vehicle speed. In addition, the threshold value (Kb) may be multiplied by the correction factor provided in response to the vehicle deceleration, in the same manner as the threshold value (Ka).

Furthermore, if it is determined at Step 207 that the variation of yaw rate deviation is smaller than the predetermined threshold value (Ka), the program proceeds to Step 209 where the present steering angle is compared with a predetermined threshold value (Kc). If it is determined that the yaw rate deviation is equal to or larger than the predetermined threshold value (Kc), i.e., if it is determined that the adjustable range of the steering angle is so small that a margin for ensuring the vehicle stability control is small, the program proceeds to Step 210 where the incompatibility is set to be of L1. In this case, only by means of the margin, it is determined to be incompatible, so that more brake directive anti-skid control parameter is set, comparing with the incompatibility L2. Accordingly, if it is determined at Step 209 that the present steering angle is smaller than the predetermined threshold value (Kc), it is determined that a steering angle adjustment for enabling a desired stable vehicle behavior to be obtained can be achieved, so that the most brake directive anti-skid control parameter is set. For example, each of four wheels is controlled independently, so as to produce the braking force reflecting the road coefficient of friction.

Figure 10:
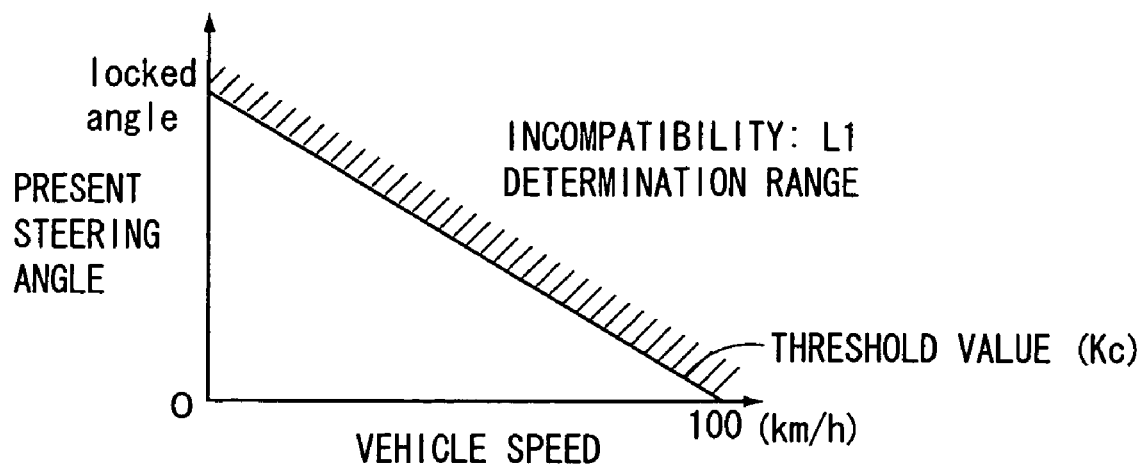
FIG. 10 is a diagram showing a map provided for determining incompatibility on the basis of a relationship between a vehicle speed and a present steering angle according to an embodiment of the present invention.
Figure 11:
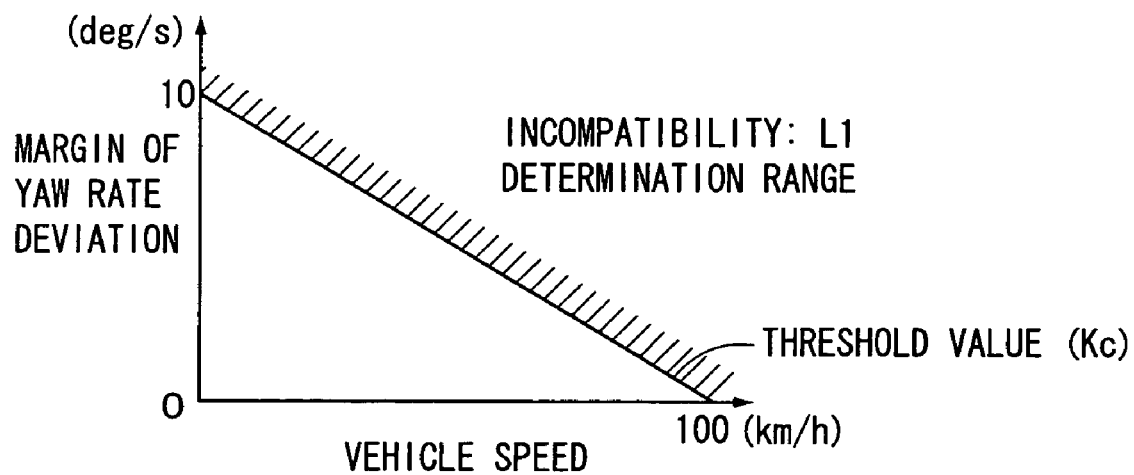
FIG. 11 is a diagram showing a map provided for determining incompatibility on the basis of a relationship between a vehicle speed and a margin of yaw rate deviation according to an embodiment of the present invention.

As shown in FIG. 10, the threshold value (Kc) may be set as a variable varied in response to the vehicle speed, thereby to obtain the effect like the threshold value (Ka). Instead of using mere present steering angle, the threshold value (Kc) may be set by means of a margin for yaw rate deviation, which is calculated by a deviation between the present steering angle and a maximal possibly obtainable steering angle, and the vehicle speed, as shown in FIG. 11. Furthermore, the threshold value (Kc) may be multiplied by the correction factor provided in response to the vehicle deceleration, in the same manner as the threshold value (Ka). The margin for yaw rate deviation is calculated as follows:

$$\text{Margin} = \{(\theta \max - \theta \, n) \cdot Vs/(n \cdot L)\} \cdot \{1/(1 + K \cdot Vs^2)\}$$

where "θ max" is the maximal possibly obtainable steering angle, "θ n" is the present steering angle, "n" is a steering gear ratio, "L" is a wheel base, "K" is a stability factor, and "Vs" is the vehicle speed.

FIG. 4 shows operation of determining the start of anti-skid control performed at Step 104 in FIG. 2. When it is determined at Step 301 that the anti-skid control has not begun yet, the program proceeds to Step 302 and Steps followed thereby, where the start of anti-skid control is determined. At Step 302, the aforementioned incompatibility is compared with the reference level of L3, and if it is determined that the incompatibility is equal to or smaller than L3, the program proceeds to Step 303 where the starting condition of anti-skid control is set to be the one giving importance to the braking force if it is determined that the incompatibility is larger than L3, the program proceeds to Step 304 where the starting condition of anti-skid control is set to be the one giving importance to the stability. Accordingly, in the case where it is possible to ensure the stability by adjusting the steering angle, large braking force can be applied to a wheel through the anti-skid control giving importance to the braking force, when the anti-skid control begins, i.e., in a high speed range, whereby a stopping distance can be shortened to a large extent. Then, it is determined at Step 305 whether the starting condition set at Step 303 or 304 has been fulfilled or not. If the starting condition has been fulfilled, the anti-skid control flag is set (1), and the program returns to the main routine as shown in FIG. 2. Although the incompatibility L3 has been selected as the reference level for determining the starting condition according to the present embodiment, the incompatibility of a lower level than L3 may be set when more importance is given to the stability, or may be set to be changeable gradually according to a plurality of steps.

As shown in FIG. 2, if it is determined at Step 105 that the anti-skid control is being performed, the program proceeds to Step 106 where parameters for the anti-skid control are set, as described before. In practice, the parameters are set as shown in FIG. 5, wherein the incompatibility set at the present cycle is compared with L1–L5 at Step 401. And, if the incompatibility has not been set at the present cycle, the program proceeds to Step 402 where the incompatibility set at the previous cycle is compared with L2–L5. As a result, in the case where the incompatibility set at the present cycle corresponds to one of L1–L5, the program proceeds to Step 403, whereas if the incompatibility set at the previous cycle corresponds to L2–L5, the program proceeds to Step 404, and if the incompatibility set at the previous cycle corresponds to L1, the program proceeds to Step 405, so that the parameters for the anti-skid control are set according to L1–L5, respectively, as will be described hereinafter.

At the outset, when the incompatibility corresponds to L1, the parameter for the anti-skid control (hereinafter, simply referred to as parameter) is set as a brake directivity B4, and when the incompatibility corresponds to L2, the parameter is set as the brake directivity B3. Likewise, when the incompatibility corresponds to L3, the parameter is set as the brake directivity B2, and when the incompatibility corresponds to L4 or L5, the parameter is set as the brake directivity B1, and thereafter the program proceeds to step 406 and Steps followed thereby. At Step 404, however, the brake directivity B(x+1), which is higher in value than the previous brake directivity Bx by a level of one step, is set, whereas the parameter is set as the brake directivity B5 at Step 405, and then the program returns to the main routine in FIG. 2. After the parameter was set at Step 403, the program proceeds to Step 406, where the present parameter is compared with the previous parameter. If they are equal, the program proceeds to Step 407, where the brake directivity (Bn) set in the present cycle is provided for the parameter, and the program returns to the main routine in FIG. 2. On the contrary, if the present parameter and the previous parameter are different from each other, the program proceeds to Step 408, where those parameters are compared with each other. If the present parameter is larger than the previous parameter, the program proceeds to Step 410, where the smaller one between the brake directivity (Bn) set in the present cycle and the brake directivity B(x+1), which is higher in value than the previous brake directivity Bx by a level of one step, is set as the present parameter, and the program returns to the main routine in FIG. 2. If the present parameter is equal to or smaller than the previous parameter, the program proceeds to Step 409, where the larger one between the brake directivity (Bn) set in the present cycle and the brake directivity B(x−1), which is lower than the previous brake directivity Bx by a level of one step, and then the program returns to the main routine in FIG. 2.

As described above, five steps of brake directivity are provided as the parameters for the anti-skid control according to the present embodiment, so that a fine tuning can be made, thereby to achieve an appropriate anti-skid control in response to driving conditions of the vehicle. Also, as it is so constituted that the brake directivity can be selected from those with various levels gradually varied, a smooth braking property can be obtained. In order to obtain more effective braking property and stability, it may be so constituted that the levels can be changed immediately, so as to enable a real time control to be achieved.

Figure 12:
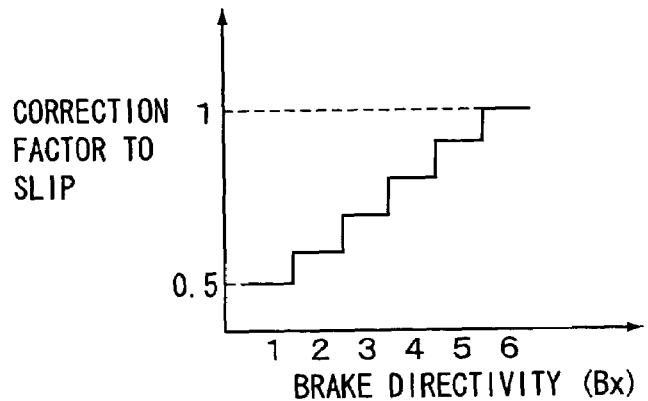
FIG. 12 is a diagram showing a map provided for setting a correction factor to slip in response to brake directivity, as a parameter giving importance to braking force according to an embodiment of the present invention.
Figure 13:
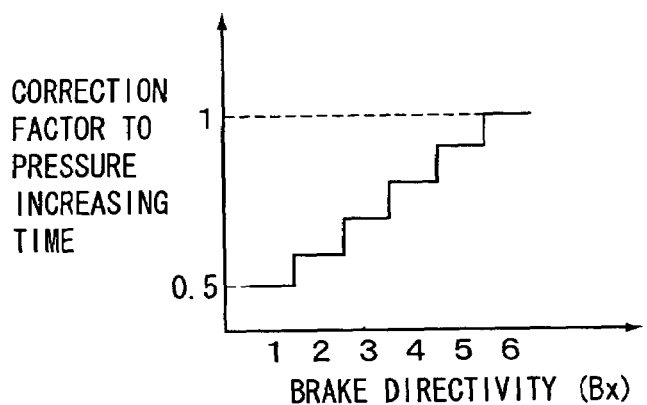
FIG. 13 is a diagram showing a map provided for setting a correction factor to pressure increasing time in response to brake directivity, as a parameter giving importance to braking force according to an embodiment of the present invention.
Figure 14:
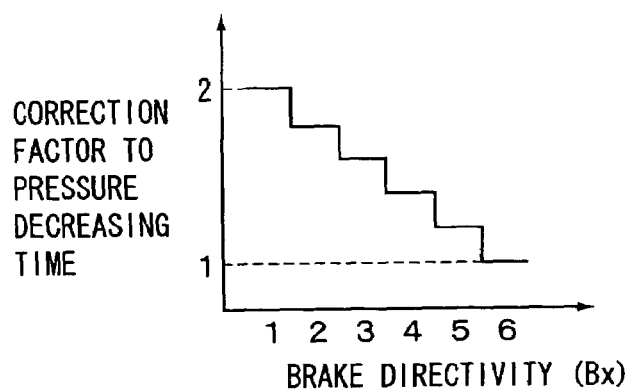
FIG. 14 is a diagram showing a map provided for setting a correction factor to pressure decreasing time in response to brake directivity, as a parameter giving importance to braking force according to an embodiment of the present invention.

As for the parameter giving importance to the braking force, there is a correction factor to slip (or, slip rate) which is set to be increased in response to increase of the brake directivity (Bx), as shown on a map in FIG. 12. Also, may be used a correction factor to pressure increasing time which is set to be increased in response to increase of the brake directivity (Bx), as shown on a map in FIG. 13, or a correction factor to pressure decreasing time which is set to be decreased in response to increase of the brake directivity (Bx), as shown on a map in FIG. 14. In contrast, in the case where the parameter giving importance to the stability is desirable, as in the case where the incompatibility corresponds to L5 or L4, the low-select control or yaw rate control may be performed, in order not to cause a difference in braking force between right and left wheels. Furthermore, it may be so constituted that anti-skid control modes are changed in dependence on the level of incompatibility. In FIGS. 6–14, practical data or references in connection with the parameters have been indicated as examples. In other words, the parameters for use in the present invention are not necessarily limited to those defined by the data or references as indicated in FIGS. 6–14.

Figure 15:
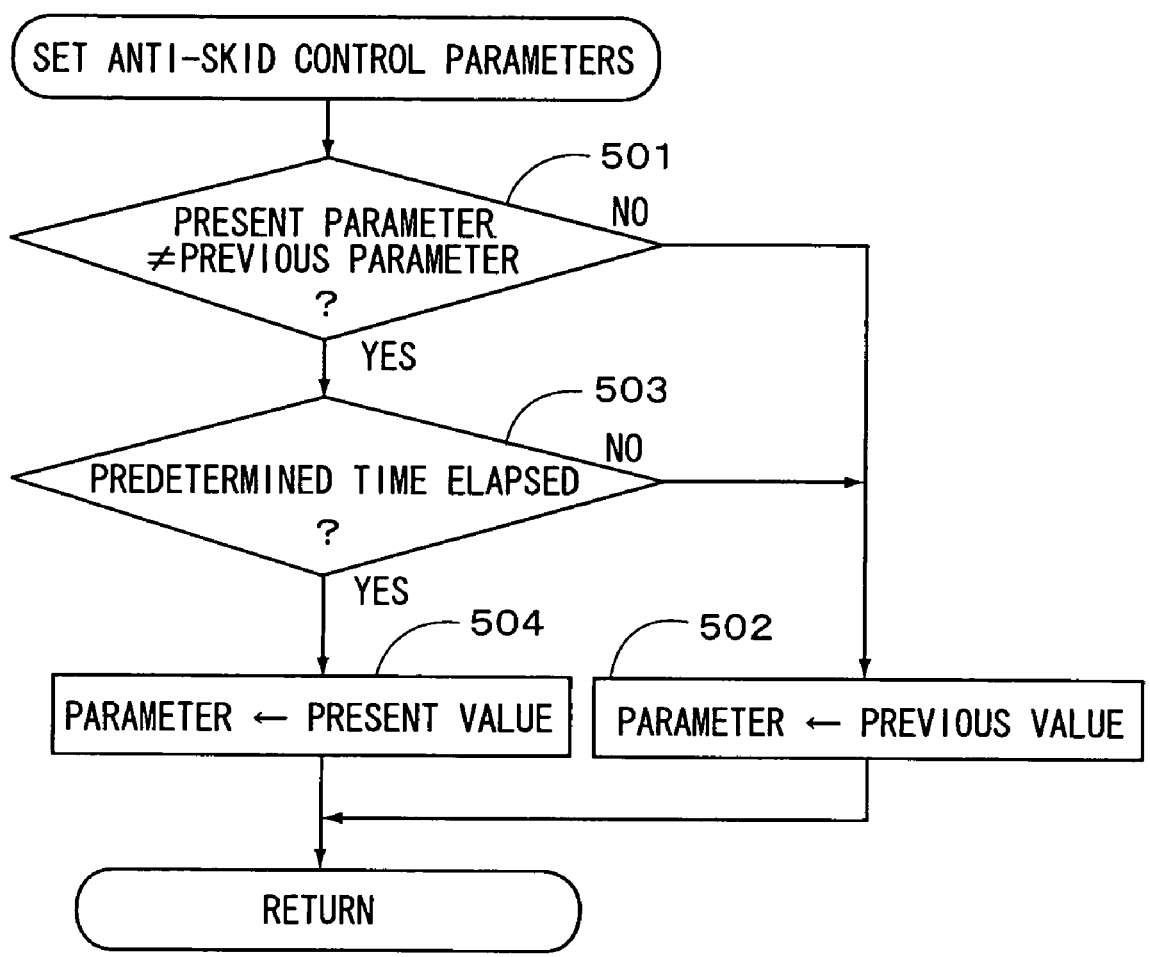
FIG. 15 is a flowchart showing another operation of setting anti-skid control parameters according to an embodiment of the present invention.

According to the present embodiment, it is so constituted that the brake directivity is changed every cycle for determining a mode to be selected in the anti-skid control, whereas it may be so constituted that the brake directivity is changed after a predetermined number of anti-skid control cycles, or a lapse of a predetermined time, as shown in FIG. 15. In this case, therefore, the brake directivity can be changed by setting a time period, irrespective of the cycle for determining the start of the anti-skid control. In FIG. 15, the present parameter is compared with the previous parameter at Step 501, and if they are equal, the program proceeds to Step 502 where the value set in the previous cycle is employed as the parameter, and returns to the main routine in FIG. 2. In the case where the present parameter is different from the previous parameter, the program proceeds to Step 503 where it is determined whether the predetermined time or more has elapsed. If the predetermined time has not elapsed, the program proceeds to Step 502, whereas if the predetermined time or more has elapsed, the program proceeds to Step 504 where the value set at the present cycle is provided for the parameter, and then returns to the main routine in FIG. 2.

With respect to means for performing the vehicle stability control in the anti-skid control mode, may be employed various controls such as the slip (rate) control, cancellation of the yaw rate control, pressure increasing or decreasing gradient control, so-called rear low select control (to control rear wheels based on a wheel with its wheel speed being lower than the other) and so on, or controls with some of them combined. Furthermore, the stability control may be performed only for a predetermined time range determined in response to the vehicle speed or deceleration, or the stability control may be performed only for a predetermined control cycle.

It should be apparent to one skilled in the art that the above-described embodiment are merely illustrative of but a few of the many possible specific embodiments of the present invention. Numerous and various other arrangements can be readily devised by those skilled in the art without departing from the spirit and scope of the invention as defined in the following claims.

What is claimed is:

1. A vehicle motion control apparatus having an anti-skid control device for controlling a braking force applied to each wheel of a vehicle, and a steering angle adjusting device for adjusting a steering angle of at least one of front and rear wheels of said vehicle, comprising:

vehicle state monitor means for monitoring at least the steering angle and a vehicle speed;

desired yaw factor setting means for setting a desired yaw factor indicative of a desired value for performing an optimal behavior control of said vehicle, on the basis of the steering angle and vehicle speed monitored by said vehicle state monitor means;

yaw factor detection means for detecting an actual yaw factor of said vehicle;

yaw deviation calculation means for calculating a yaw deviation between the desired yaw factor set by said desired yaw factor setting means and the actual yaw factor detected by said yaw factor detection means, said steering angle adjusting device adjusting the steering angle of at least one of said front and rear wheels to cancel the yaw deviation calculated by said yaw deviation calculation means to be substantially zero;

incompatibility determination means for determining incompatibility between said steering angle adjusting device and said anti-skid control device, on the basis of a state of said wheel adjusted by said steering angle adjusting device to cancel the yaw deviation calculated by said yaw deviation calculation means; and parameter setting means for setting a predetermined parameter provided between a vehicle stability directive parameter and a brake directive parameter, on the basis of the incompatibility determined by said incompatibility determination means, said anti-skid control device controlling the braking force applied to each wheel of said vehicle on the basis of the predetermined parameter set by said parameter setting means.

2. A vehicle motion control apparatus as set forth in claim 1, wherein said parameter setting means sets the predetermined parameter to be close to the vehicle stability directive parameter when said incompatibility determination means determined that the adjustment of said wheel by said steering angle adjusting device is inoperative, and wherein said parameter setting means sets the predetermined parameter to be close to the brake directive parameter when said incompatibility determination means determined that the adjustment of said wheel by said steering angle adjusting device is operative.

3. A vehicle motion control apparatus as set forth in claim 2, wherein said yaw deviation calculation means calculates at least one of a yaw rate deviation, a yaw angle deviation and a variation of yaw rate deviation to provide the yaw deviation, and wherein said incompatibility determination means compares the yaw deviation with a predetermined threshold value, to determine the incompatibility on the basis of the result of comparison.

4. A vehicle motion control apparatus as set forth in claim 3, wherein said incompatibility determination means sets the predetermined threshold value on the basis of at least one of the vehicle speed and a vehicle deceleration calculated on the basis thereof.

5. A vehicle motion control apparatus as set forth in claim 2, wherein said incompatibility determination means compares the steering angle adjusted by said steering angle adjusting device with a predetermined threshold value, to determine the incompatibility on the basis of the result of comparison.

6. A vehicle motion control apparatus as set forth in claim 5, wherein said incompatibility determination means sets the predetermined threshold value on the basis of at least one of the vehicle speed and a vehicle deceleration calculated on the basis thereof.

7. A vehicle motion control apparatus as set forth in claim 1, wherein said yaw deviation calculation means calculates at least one of a yaw rate deviation, a yaw angle deviation and a variation of yaw rate deviation to provide the yaw deviation, and wherein said incompatibility determination means compares the yaw deviation with a predetermined threshold value, to determine the incompatibility on the basis of the result of comparison.

8. A vehicle motion control apparatus as set forth in claim 1, wherein said incompatibility determination means compares the steering angle adjusted by said steering angle adjusting device with a predetermined threshold value, to determine the incompatibility on the basis of the result of comparison.

* * * * *